US010122889B1

(12) United States Patent
Kurian et al.

(10) Patent No.: US 10,122,889 B1
(45) Date of Patent: Nov. 6, 2018

(54) DEVICE FOR GENERATING A RESOURCE DISTRIBUTION DOCUMENT WITH PHYSICAL AUTHENTICATION MARKERS

(71) Applicant: BANK OF AMERICA CORPORATION, Charlotte, NC (US)

(72) Inventors: Manu Jacob Kurian, Dallas, TX (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 15/588,801

(22) Filed: May 8, 2017

(51) Int. Cl.
H04N 1/00 (2006.01)
H04N 1/32 (2006.01)
G06K 15/02 (2006.01)
G06T 1/00 (2006.01)

(52) U.S. Cl.
CPC ......... *H04N 1/32267* (2013.01); *G06K 15/02* (2013.01); *G06T 1/0021* (2013.01); *H04N 1/00408* (2013.01); *G06T 2201/0051* (2013.01); *H04N 2201/0034* (2013.01); *H04N 2201/327* (2013.01)

(58) Field of Classification Search
None
See application file for complete search history.

(56) References Cited

U.S. PATENT DOCUMENTS

| | | | |
|---|---|---|---|
| 5,412,190 A | 5/1995 | Josephson et al. | |
| 5,527,117 A * | 6/1996 | Roy | B41J 2/285 335/255 |
| 5,823,691 A * | 10/1998 | Langner | B41J 3/32 400/127 |
| 6,189,785 B1 | 2/2001 | Lowery | |
| 6,243,689 B1 | 6/2001 | Norton | |
| 6,554,185 B1 | 4/2003 | Montross et al. | |
| 6,578,760 B1 | 6/2003 | Otto | |
| 6,996,263 B2 | 2/2006 | Jones et al. | |
| 7,004,382 B2 | 2/2006 | Sandru | |

(Continued)

OTHER PUBLICATIONS

International Preliminary Report on Patentability for International Application No. PCT/US2012/027892 dated Sep. 19, 2013.

(Continued)

*Primary Examiner* — Madelein T Nguyen
(74) *Attorney, Agent, or Firm* — Michael A. Springs; Moore & Van Allen PLLC; Nicholas C. Russell

(57) ABSTRACT

Embodiments of the invention are directed to a device that physically imprints a paper resource distribution document for verification and authenticity purposes. In this way, the device links to a user network and associates with resource distributions available for the user. Upon authorization of the user into the device, the device may receive input from a user, including an amount for the paper resource distribution document. Upon receiving the information from the user, the device activates and prints a resource distribution document with at least a portion of the paper resource distribution document printed with dimpled or embossed characters. As such, the dimpled or embossed character recognition at distribution of the resource distribution document confirms the paper resource distribution document's authenticity.

20 Claims, 7 Drawing Sheets

(56) References Cited

U.S. PATENT DOCUMENTS

| | | | |
|---|---|---|---|
| 7,016,532 B2 | 3/2006 | Boncyk et al. | |
| 7,090,122 B1 | 8/2006 | Warren et al. | |
| 7,113,615 B2 * | 9/2006 | Rhoads | H04N 1/00846 |
| | | | 382/100 |
| 7,137,551 B1 | 11/2006 | Crews et al. | |
| 7,155,228 B2 | 12/2006 | Rappaport et al. | |
| 7,207,478 B1 | 4/2007 | Blackson et al. | |
| 7,389,913 B2 | 6/2008 | Starrs | |
| 7,403,652 B2 | 7/2008 | Boncyk et al. | |
| 7,412,081 B2 | 8/2008 | Doi | |
| 7,424,303 B2 | 9/2008 | Al-Sarawi | |
| 7,458,508 B1 | 12/2008 | Shao et al. | |
| 7,477,780 B2 | 1/2009 | Boncyk et al. | |
| 7,500,607 B2 | 3/2009 | Williams | |
| 7,526,280 B2 | 4/2009 | Jung et al. | |
| 7,564,469 B2 | 7/2009 | Cohen | |
| 7,565,008 B2 | 7/2009 | Boncyk et al. | |
| 7,565,469 B2 | 7/2009 | Mylly et al. | |
| 7,584,128 B2 | 9/2009 | Mason et al. | |
| 7,627,525 B2 | 12/2009 | Williams | |
| 7,680,324 B2 | 3/2010 | Boncyk et al. | |
| 7,702,588 B2 | 4/2010 | Gilder et al. | |
| 7,752,132 B2 | 7/2010 | Stewart et al. | |
| 7,775,437 B2 | 8/2010 | Cohen | |
| 7,792,738 B2 | 9/2010 | Channell | |
| 7,814,336 B1 | 10/2010 | Nisbet et al. | |
| 7,840,456 B2 | 11/2010 | Patzer | |
| 7,881,529 B2 | 2/2011 | Boncyk et al. | |
| 7,899,243 B2 | 3/2011 | Boncyk et al. | |
| 7,899,252 B2 | 3/2011 | Boncyk et al. | |
| 7,905,396 B2 | 3/2011 | Tidwell et al. | |
| 7,912,785 B1 | 3/2011 | Kay | |
| 8,045,784 B2 | 10/2011 | Price et al. | |
| 8,060,441 B2 | 11/2011 | Stewart et al. | |
| 8,082,207 B2 | 12/2011 | Bates et al. | |
| 8,104,674 B2 | 1/2012 | Smith et al. | |
| 8,138,930 B1 | 3/2012 | Heath | |
| 8,195,570 B1 | 6/2012 | Barron et al. | |
| 8,255,278 B1 | 8/2012 | Young et al. | |
| 8,290,237 B1 | 10/2012 | Burks et al. | |
| 8,332,329 B1 | 12/2012 | Thiele | |
| 8,385,950 B1 | 2/2013 | Wagner et al. | |
| 8,401,904 B1 | 3/2013 | Simakov et al. | |
| 8,438,110 B2 | 5/2013 | Calman et al. | |
| 8,474,704 B1 | 7/2013 | Grimm et al. | |
| 8,583,492 B2 | 11/2013 | Connell | |
| 8,626,662 B2 | 1/2014 | Pinski | |
| 8,639,016 B2 | 1/2014 | Frew | |
| 8,639,621 B1 | 1/2014 | Ellis et al. | |
| 8,714,336 B2 | 5/2014 | Csulits et al. | |
| 9,002,749 B1 | 4/2015 | Thiele | |
| 9,025,851 B2 | 5/2015 | Smith et al. | |
| 9,031,308 B2 | 5/2015 | Sandoz et al. | |
| 9,171,296 B1 | 10/2015 | Kurian | |
| 9,355,391 B2 | 5/2016 | von Behren et al. | |
| 9,690,967 B1 * | 6/2017 | Brundage | G06K 7/1417 |
| 9,754,341 B2 * | 9/2017 | Falkenstern | G06T 1/0021 |
| 9,846,814 B1 * | 12/2017 | Fraser | G06K 9/209 |
| 2002/0013728 A1 | 1/2002 | Wilkman | |
| 2002/0026423 A1 | 2/2002 | Maritzen et al. | |
| 2002/0042773 A1 | 4/2002 | Fugitte et al. | |
| 2002/0073025 A1 | 6/2002 | Tanner et al. | |
| 2002/0152179 A1 | 10/2002 | Racov | |
| 2003/0035147 A1 * | 2/2003 | Patton | G07D 7/004 |
| | | | 358/3.28 |
| 2003/0064705 A1 | 4/2003 | Desiderio | |
| 2003/0231785 A1 * | 12/2003 | Rhoads | G06F 17/30876 |
| | | | 382/100 |
| 2004/0021584 A1 | 2/2004 | Hartz, Jr. et al. | |
| 2004/0024709 A1 | 2/2004 | Yu et al. | |
| 2004/0111370 A1 | 6/2004 | Saylors et al. | |
| 2006/0049242 A1 | 3/2006 | Mejias et al. | |
| 2006/0074799 A1 | 4/2006 | Averyt et al. | |
| 2006/0074803 A1 | 4/2006 | Crowell et al. | |
| 2006/0100951 A1 | 5/2006 | Mylet et al. | |
| 2006/0144923 A1 | 7/2006 | VanKirk et al. | |
| 2007/0016790 A1 * | 1/2007 | Brundage | G06T 1/0071 |
| | | | 713/176 |
| 2007/0094095 A1 | 4/2007 | Kilby | |
| 2007/0140595 A1 | 6/2007 | Taylor et al. | |
| 2007/0175977 A1 | 8/2007 | Bauer et al. | |
| 2007/0278290 A1 | 12/2007 | Messerges et al. | |
| 2008/0021803 A1 | 1/2008 | Ahles et al. | |
| 2008/0040278 A1 | 2/2008 | DeWitt | |
| 2008/0109324 A1 | 5/2008 | Rosmarin et al. | |
| 2008/0147561 A1 | 6/2008 | Euchner et al. | |
| 2008/0214210 A1 | 9/2008 | Rasanen et al. | |
| 2008/0245854 A1 | 10/2008 | Monden | |
| 2008/0268876 A1 | 10/2008 | Gelfand et al. | |
| 2008/0307307 A1 | 12/2008 | Ciudad et al. | |
| 2009/0005010 A1 | 1/2009 | Dote et al. | |
| 2009/0094125 A1 | 4/2009 | Killian et al. | |
| 2009/0102859 A1 | 4/2009 | Athsani et al. | |
| 2009/0140839 A1 | 6/2009 | Bishop et al. | |
| 2009/0144164 A1 | 6/2009 | Wane et al. | |
| 2009/0171850 A1 | 7/2009 | Yuval | |
| 2009/0182748 A1 | 7/2009 | Walker | |
| 2009/0185241 A1 | 7/2009 | Nepomniachtchi | |
| 2009/0192903 A1 | 7/2009 | Weiss et al. | |
| 2009/0200385 A1 * | 8/2009 | Hachey | G06K 19/06 |
| | | | 235/494 |
| 2009/0204511 A1 | 8/2009 | Tsang | |
| 2009/0250515 A1 | 10/2009 | Todd et al. | |
| 2009/0254447 A1 | 10/2009 | Blades | |
| 2009/0327133 A1 | 12/2009 | Aharoni et al. | |
| 2010/0078471 A1 | 4/2010 | Lin et al. | |
| 2010/0122216 A1 | 5/2010 | Song et al. | |
| 2010/0125510 A1 | 5/2010 | Smith et al. | |
| 2010/0185529 A1 | 7/2010 | Chesnut et al. | |
| 2010/0220364 A1 * | 9/2010 | Picard | G03G 21/046 |
| | | | 358/3.28 |
| 2010/0228624 A1 | 9/2010 | Morris et al. | |
| 2010/0250581 A1 | 9/2010 | Chau | |
| 2010/0316204 A1 | 12/2010 | Loeb et al. | |
| 2011/0022540 A1 | 1/2011 | Stern et al. | |
| 2011/0034176 A1 | 2/2011 | Lord et al. | |
| 2011/0091092 A1 | 4/2011 | Nepomniachtchi et al. | |
| 2011/0106845 A1 | 5/2011 | Lipson et al. | |
| 2011/0119155 A1 | 5/2011 | Hammad et al. | |
| 2011/0202466 A1 | 8/2011 | Carter | |
| 2011/0280450 A1 | 11/2011 | Nepomniachtchi et al. | |
| 2011/0320325 A1 | 12/2011 | Preston et al. | |
| 2012/0158584 A1 | 6/2012 | Behren et al. | |
| 2012/0166333 A1 | 6/2012 | von Behren et al. | |
| 2012/0179609 A1 | 8/2012 | Agarwal et al. | |
| 2012/0203632 A1 | 8/2012 | Blum et al. | |
| 2012/0229624 A1 | 9/2012 | Calman et al. | |
| 2012/0229625 A1 | 9/2012 | Calman et al. | |
| 2012/0229647 A1 | 9/2012 | Calman et al. | |
| 2012/0229657 A1 | 9/2012 | Calman et al. | |
| 2012/0230538 A1 | 9/2012 | Calman et al. | |
| 2012/0230539 A1 | 9/2012 | Calman et al. | |
| 2012/0230540 A1 | 9/2012 | Calman et al. | |
| 2012/0230548 A1 | 9/2012 | Calman et al. | |
| 2012/0230557 A1 | 9/2012 | Calman et al. | |
| 2012/0230577 A1 | 9/2012 | Calman et al. | |
| 2012/0231424 A1 | 9/2012 | Calman et al. | |
| 2012/0231425 A1 | 9/2012 | Calman et al. | |
| 2012/0231814 A1 | 9/2012 | Calman et al. | |
| 2012/0231840 A1 | 9/2012 | Calman et al. | |
| 2012/0232937 A1 | 9/2012 | Calman et al. | |
| 2012/0232954 A1 | 9/2012 | Calman et al. | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0232993 A1 | 9/2012 | Calman et al. | |
| 2012/0233003 A1 | 9/2012 | Calman et al. | |
| 2012/0233005 A1 | 9/2012 | White | |
| 2012/0233015 A1 | 9/2012 | Calman et al. | |
| 2012/0233025 A1 | 9/2012 | Calman et al. | |
| 2012/0233032 A1 | 9/2012 | Calman et al. | |
| 2012/0233033 A1 | 9/2012 | Calman et al. | |
| 2012/0233070 A1 | 9/2012 | Calman et al. | |

(56) References Cited

U.S. PATENT DOCUMENTS

| | | |
|---|---|---|
| 2012/0233072 A1 | 9/2012 | Calman et al. |
| 2012/0233089 A1 | 9/2012 | Calman et al. |
| 2012/0101927 A1 | 11/2012 | Leibon et al. |
| 2013/0132219 A1 | 5/2013 | Liberty |
| 2013/0155474 A1 | 6/2013 | Roach et al. |
| 2013/0191227 A1 | 7/2013 | Pasa et al. |
| 2013/0218721 A1 | 8/2013 | Borhan et al. |
| 2013/0246199 A1 | 9/2013 | Carlson |
| 2013/0246260 A1 | 9/2013 | Barten et al. |
| 2013/0246261 A1 | 9/2013 | Purves et al. |
| 2013/0254115 A1 | 9/2013 | Pasa et al. |
| 2013/0256403 A1 | 10/2013 | MacKinnon |
| 2013/0317928 A1 | 11/2013 | Laracey |
| 2013/0325667 A1 | 12/2013 | Satyavolu et al. |
| 2013/0325681 A1 | 12/2013 | Somashekar et al. |
| 2015/0002915 A1* | 1/2015 | Lebaschi .............. H04N 1/56 358/538 |
| 2016/0005008 A1 | 1/2016 | Kumar |
| 2016/0026999 A1 | 1/2016 | Kurian |
| 2016/0027034 A1* | 1/2016 | Kim .................. G06Q 20/405 705/14.27 |
| 2016/0117675 A1* | 4/2016 | Celikyilmaz ....... H04L 67/2814 705/44 |
| 2016/0148175 A1* | 5/2016 | Ovick ................ G06Q 20/027 705/44 |
| 2016/0294727 A1* | 10/2016 | Varghese .............. H04W 12/08 |
| 2017/0024845 A1* | 1/2017 | Filler .................... G06T 1/0028 |
| 2017/0116588 A1* | 4/2017 | Conant .................. G06Q 20/18 |
| 2018/0012234 A1* | 1/2018 | Kelly .................. G06Q 20/042 |
| 2018/0129847 A1* | 5/2018 | Brundage ............. G06T 1/0021 |
| 2018/0130169 A1* | 5/2018 | Falkenstern ......... G07D 7/0034 |

OTHER PUBLICATIONS

International Preliminary Report on Patentability for International Application No. PCT/US2012/027890 dated Sep. 19, 2013.
International Preliminary Report on Patentability for International Application No. PCT/US2012/028036 dated Sep. 19, 2013.
International Preliminary Report on Patentability for International Application No. PCT/US2012/028008 dated Sep. 19, 2013.
International Preliminary Report on Patentability for International Application No. PCT/US2012/027912 dated Sep. 19, 2013.
International Search Report and Written Opinion for International Application No. PCT/US2012/027890 dated Feb. 5, 2013.
International Search Report and Written Opinion for International Application No. PCT/US2012/048697 dated Oct. 12, 2012.
International Search Report and Written Opinion for International Application No. PCT/US2012/028036 dated Jun. 4, 2012.
International Search Report and Written Opinion for International Application No. PCT/US2012/028008 dated Jun. 4, 2012.
International Preliminary Report on Patentability for International Application No. PCT/US2012/048697 dated Feb. 4, 2014.

* cited by examiner

DEVICE FOR GENERATING A RESOURCE DISTRIBUTION DOCUMENT WITH PHYSICAL AUTHENTICATION MARKERS

BACKGROUND

With advancements in technology, user resource access and distribution without authorization is becoming easier. As such, third parties may be able to manipulate resource access, deposits, and distribution. Furthermore, paper resource distribution documents have limited amounts of security associated therewith.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Paper resource distribution documents have limited amount of multi-factor authentication or security associated with the distribution of the paper resource distribution documents. Thus, a need exists for a device to generate physical authentication markers on a paper or physical resource distribution document for advanced security and authentication of the resource distribution document.

In some embodiments, this invention is a device that imprints, either physically or digitally, a paper resource distribution document for verification and authenticity purposes. In some embodiments, the device may receive input from a user including an amount for the paper resource distribution document, a date, a payee, remittance data, date to remit, and the like. Once the device receives this information, the device will print the paper resource distribution document or print a portion of the paper resource distribution document with dots or special ink that confirms the paper resource distribution document's authenticity. Furthermore, the device may generate an imprint on the paper resource distribution document using user biometrics. As such, the device generates a digital or physical imprint on the paper resource distribution document to confirm the generating of the paper resource distribution document was authentic.

Embodiments of the invention relate to systems, methods, and computer program products for a physical authentication marker device comprising: linking via a wireless network the physical authentication marker device to internet enabled user devices upon deployment of the physical authentication marker device; associating user resource distribution accounts to the physical authentication marker device and store the accounts in the memory device; requiring an authentication from the user to access the physical authentication marker device, wherein the authentication is performed from one of the user devices and communicated to the physical authentication marker device; allowing user input of information for resource distribution document generation upon authorized authentication; receiving user input of information and confirm request for resource distribution document generation; generating resource distribution document based on input of information, wherein generating the resource distribution document comprises manipulating a printing medium via dimples or embossment of characters associated with the information; and storing an image of the generated resource distribution document for reconciliation.

In some embodiments, the invention further comprises: receiving an indication from a receiving entity that the generated resource distribution document was provided to the receiving entity; confirming authentication of resource distribution document; allowing receiving party to post resource distribution document based on confirmation of authentication; and receiving communication from receiving party of posting of resource distribution document for reconciliation at the physical authentication marker device.

In some embodiments, the invention further comprises encoding the resource distribution document with printed encoding of information from the resource distribution document for a receiving party to decode for confirmation of information on the resource distribution document.

In some embodiments, the authentication from the user to access the physical authentication marker device further comprises authenticating the user into the physical authentication marker device using authentication requirements from one or more applications associated with accessing user resource distribution accounts.

In some embodiments, allowing user input of information for resource distribution document generation upon authorized authentication, further comprises allowing the user to input the information on a mobile device that is linked to the physical authentication marker device via a wireless network, wherein the information comprises an account, a payee, a date, a remittance date, and an amount for resource distribution. In some embodiments, allowing user input of information for resource distribution document generation upon authorized authentication, further comprises allowing the user to input the information directly on the physical authentication marker device via an interface associated with the physical authentication marker device, wherein the information comprises an account, a payee, a date, a remittance date, and an amount for resource distribution.

In some embodiments, user resource distribution accounts comprise one or more accounts across multiple entities that allow for user transfer of resources via paper resource distribution documents to a separate third party.

In some embodiments, dimpling or embossing further comprises dimpling or embossing characters of the resource distribution document including a payee and an amount, wherein the dimpling or embossing occurs to at least a portion of the characters or an outline of the characters such as to identify the characters via a dimpling or embossing pattern and wherein ink is further applied to the dimpling or embossing associated with the information. In some embodiments, the printing medium comprises blank paper or a blank check. In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
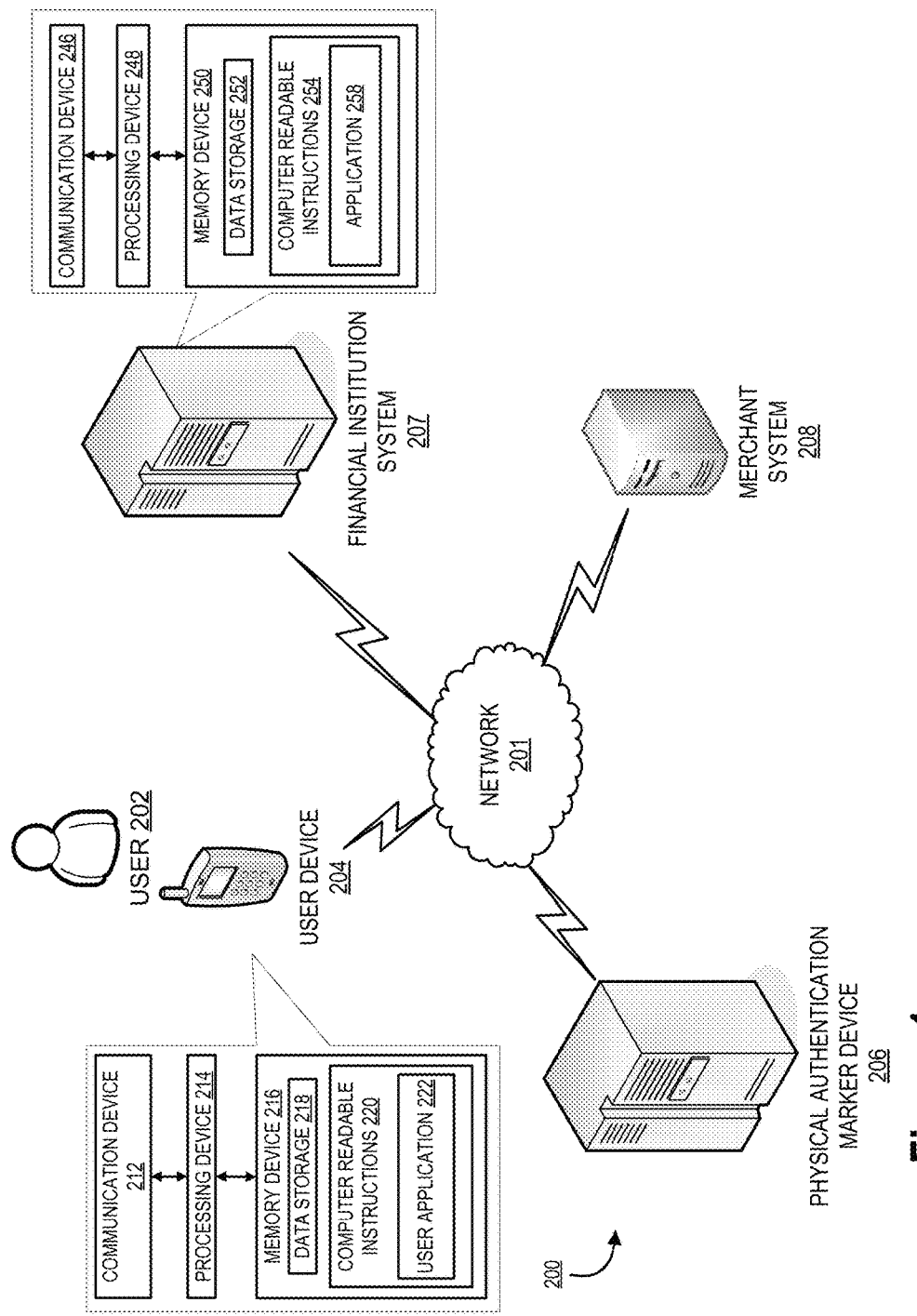
Figure 2:
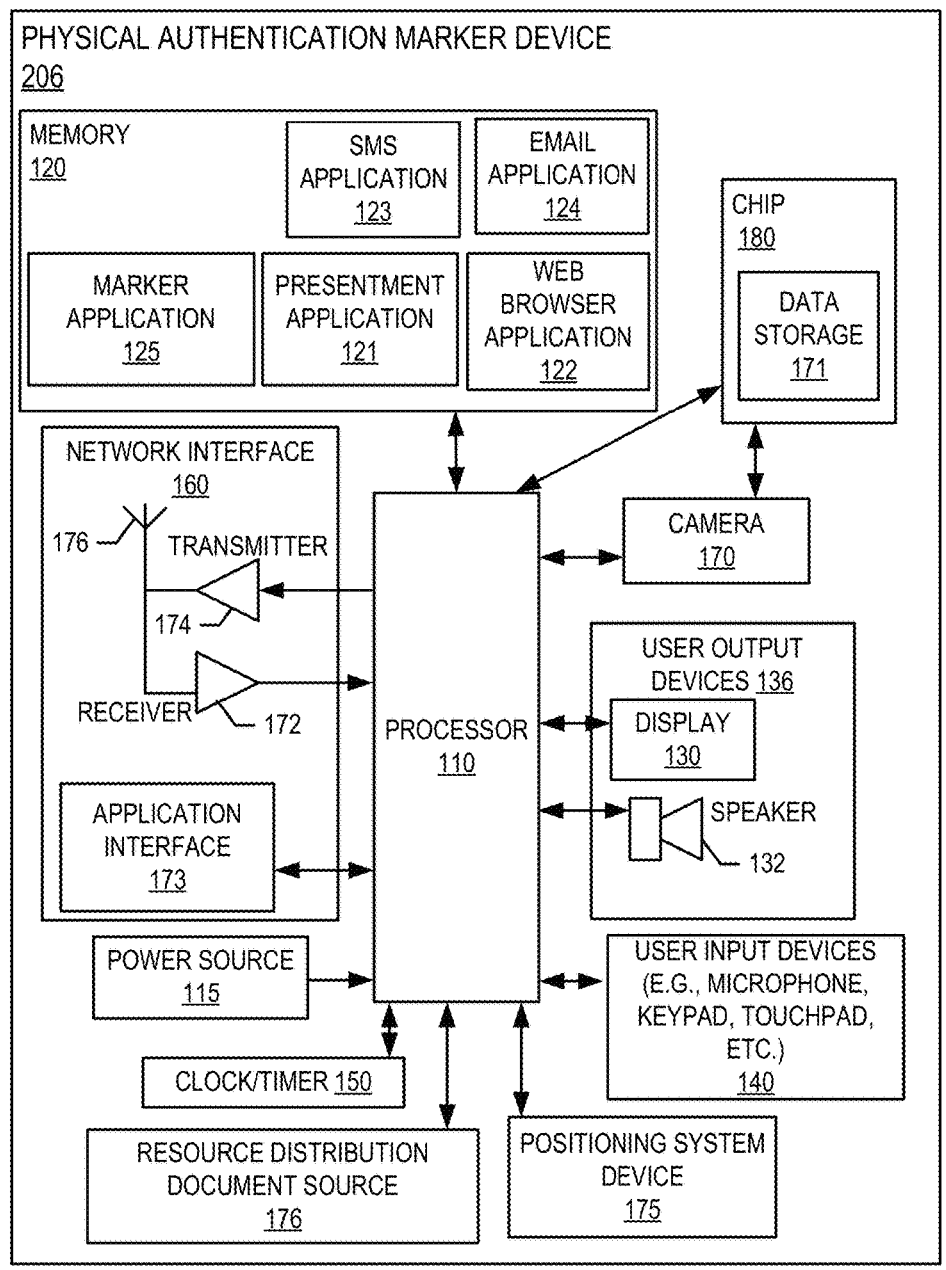
Figure 3:
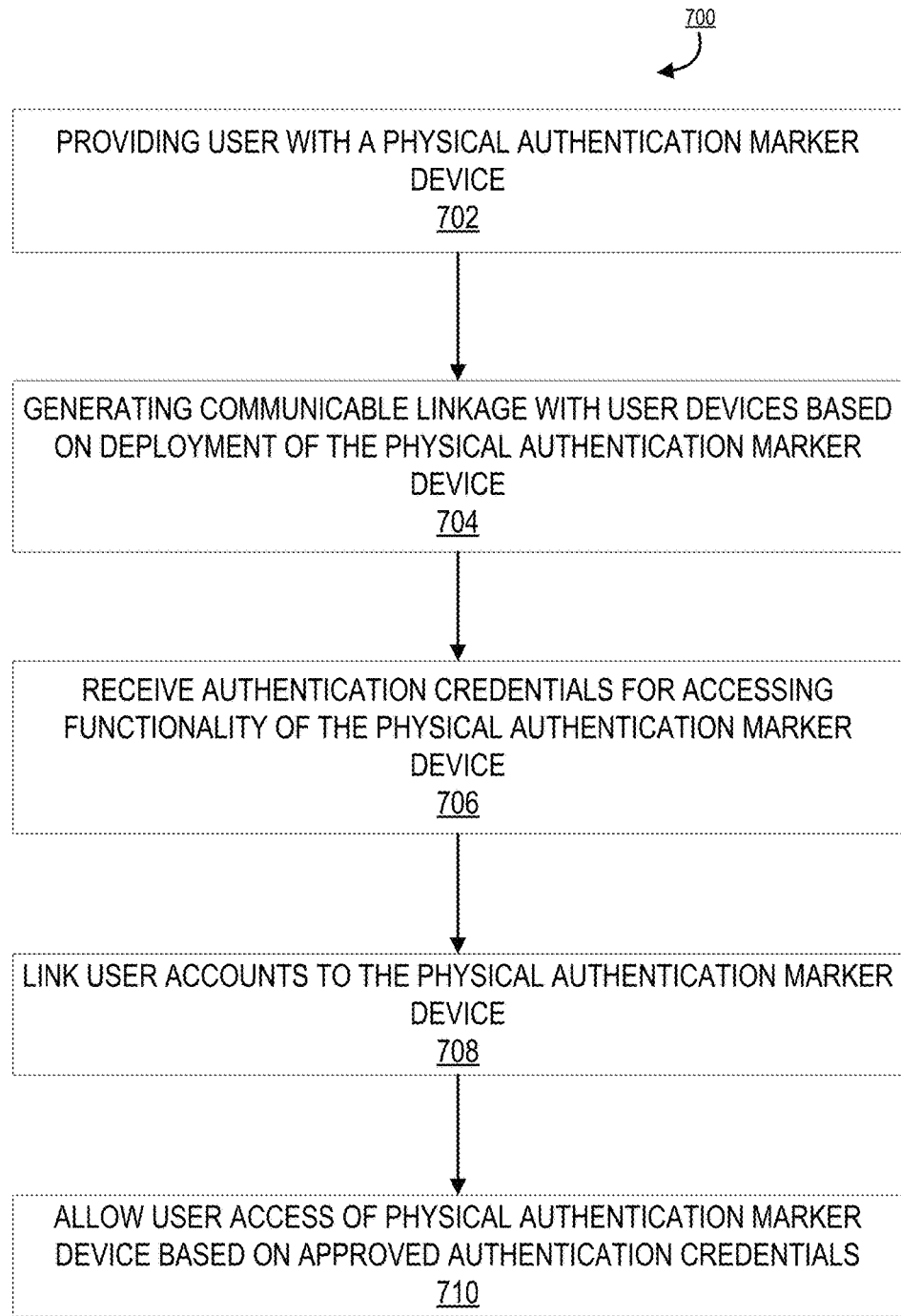
Figure 4:
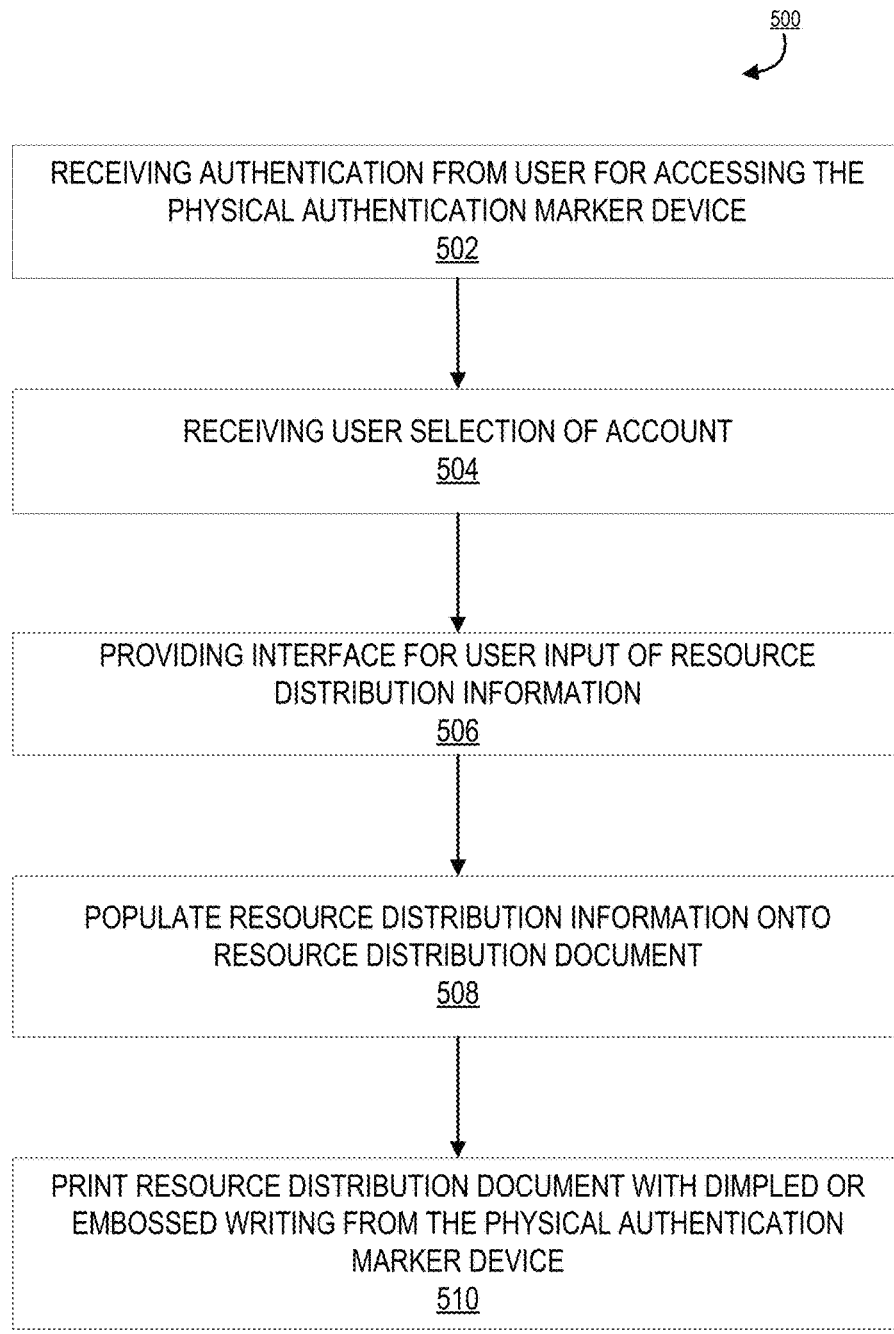
Figure 5:
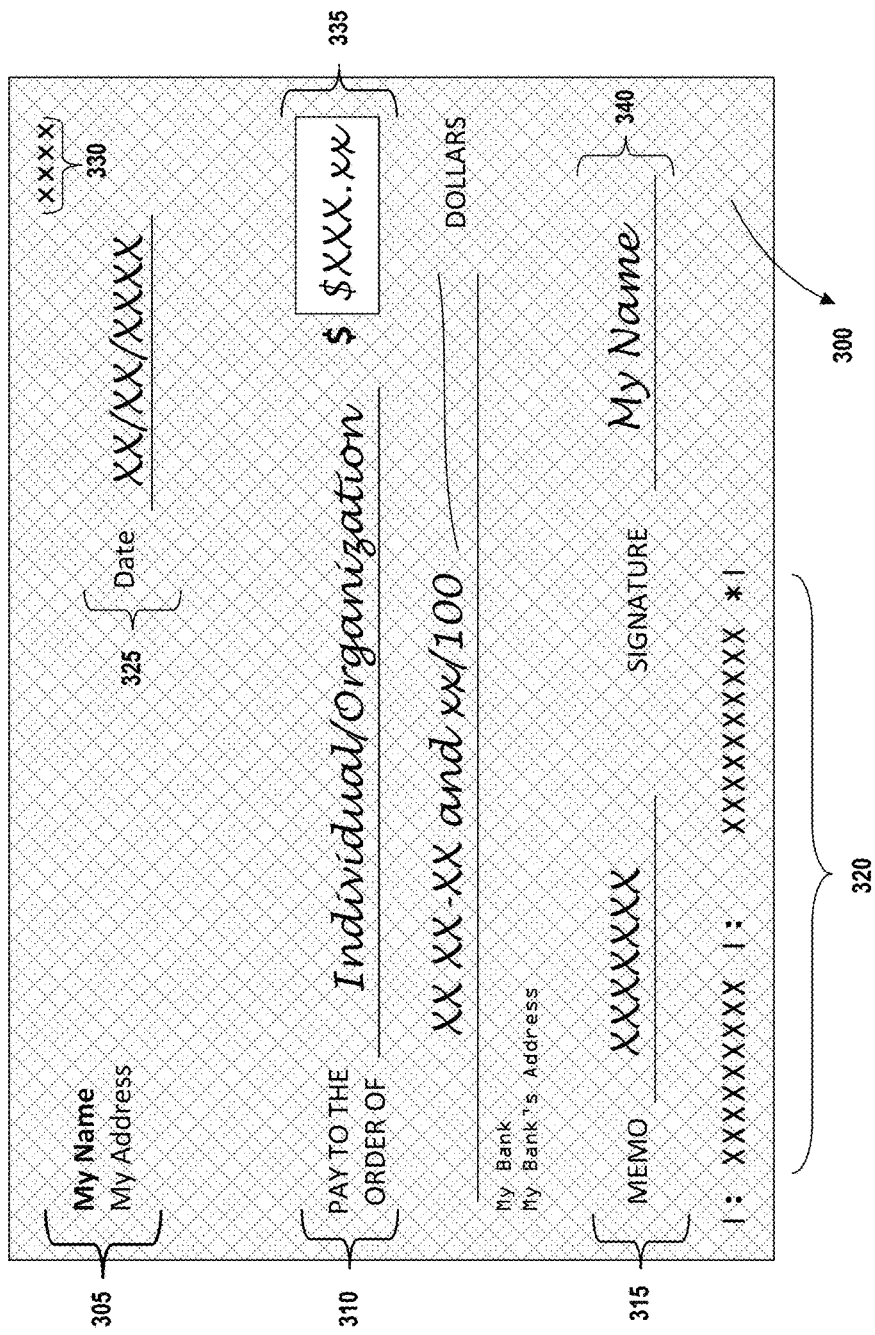
Figure 6:
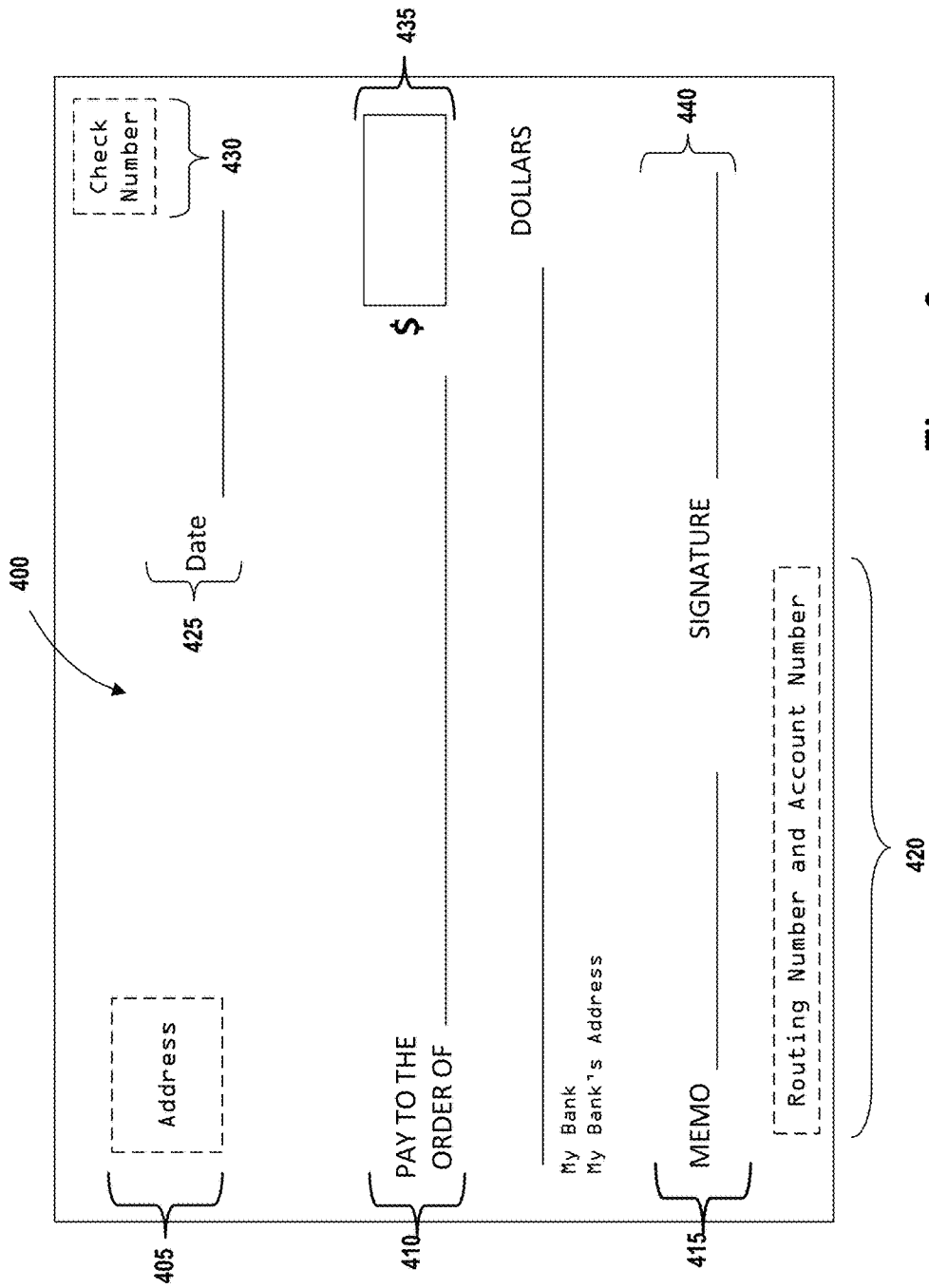
Figure 7:
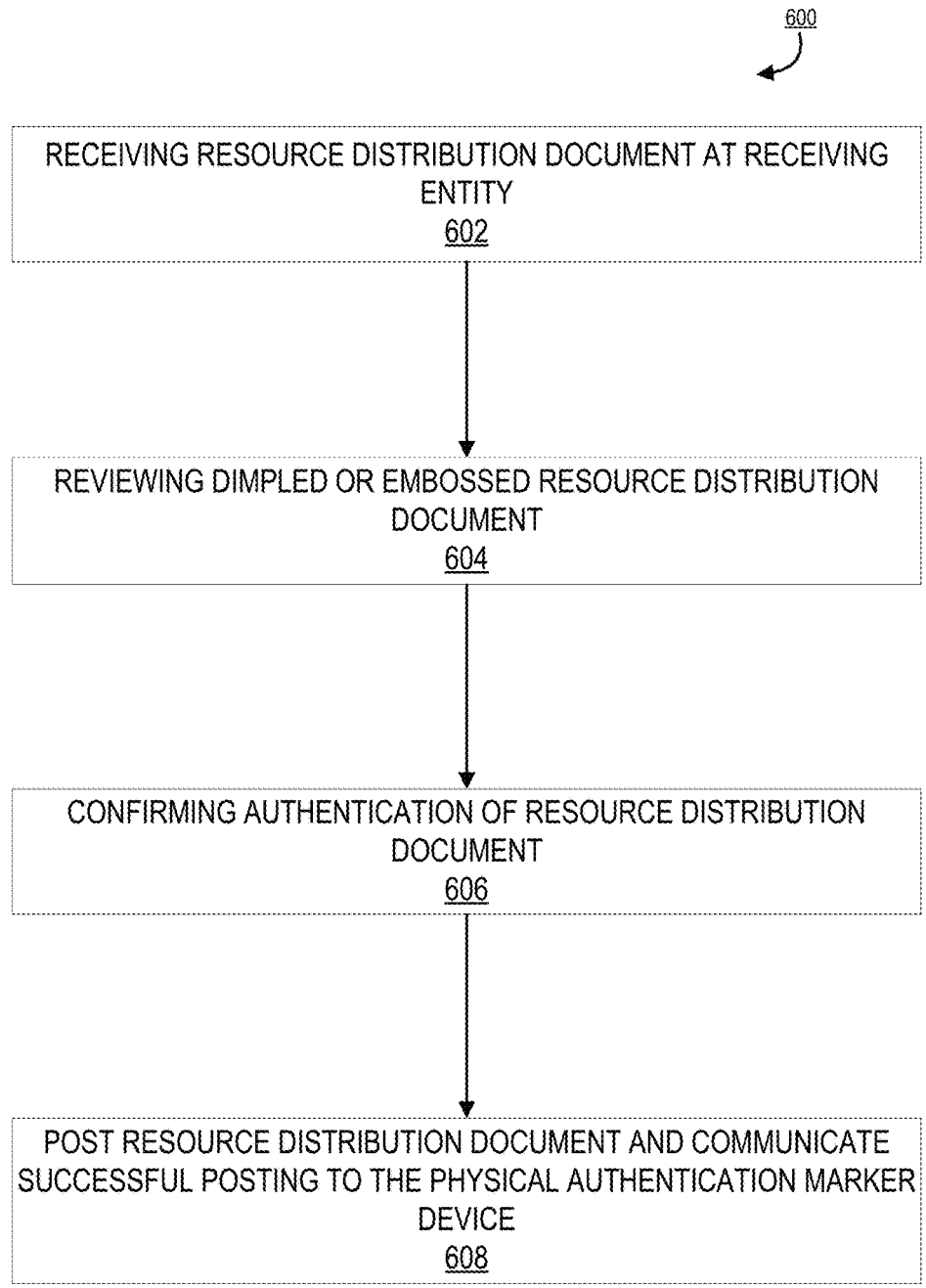

Having thus described embodiments of the invention in general terms, reference will now be made to the accompanying drawings, where:

FIG. 1 illustrates a resource distribution device system environment, in accordance with embodiments of the present invention;

FIG. 2 illustrates a physical authentication marker device system, in accordance with embodiments of the present invention;

FIG. 3 is a flowchart illustrating generation and activation of the physical authentication marker device, in accordance with embodiments of the present invention;

FIG. 4 is a flowchart illustrating user of the physical authentication marker device, in accordance with embodiments of the present invention;

FIG. 5 illustrates a representation of one embodiment of a resource distribution document, in accordance with embodiments of the present invention;

FIG. 6 illustrates a representation of one embodiment of a resource distribution document, in accordance with embodiments of the present invention; and FIG. 7 illustrates utilization of the resource distribution document generated from the physical authentication marker device, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. In some embodiments, a "marker code" as used herein may refer to one or more marks, signals, data points, or the like that may indicate a misappropriation.

A dimple, dot, emboss or the like as used herein may refer to an impression, hole or another disfiguration of a paper. In this way a dimple, dot, emboss, hole, disfiguration or the like of a piece of paper may be generated by the device or system disclosed within.

In some embodiments, a "resource distribution document" as used herein may refer to any paper or digital document that may transfer or exchange resources, such as funds, across individuals or entities. Resource distribution documents may include checks, certified checks, automated clearing house, contract, or the like.

In some embodiments, an "entity" may be a financial institution or third party merchant. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution. In still other embodiments, the entity may be the merchant itself. In some embodiments, the "user" may be a customer (e.g., an account holder).

In some embodiments, this invention is a device that imprints, either physically or digitally, a paper resource distribution document for verification and authenticity purposes. In some embodiments, the device may receive input from a user including an amount for the paper resource distribution document, a date, a payee, remittance data, date to remit, and the like. Once the device receives this information, the device will print the paper resource distribution document or print a portion of the paper resource distribution document with dots or special ink that confirms the paper resource distribution document's authenticity. Furthermore, the device may generate an imprint on the paper resource distribution document using user biometrics. As such, the device generates a digital or physical imprint on the paper resource distribution document to confirm the generating of the paper resource distribution document was authentic.

In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document.

In some embodiments, the system may encode the amount with dimples or embossing to appear as a random code of numbers, letters, or other characters. In this way, there will be no way of knowing the amount the resource distribution document is made out for without the receiving institution decoding the random code. Furthermore, the pattern of the dimples or embossments will determine the amount. As such, the device may print an actual amount on the resource distribution document in ink, but that amount may be different than the actual amount the resource distribution document is for. In this way, the pattern of the dimples or embossments will determine via the coded pattern, the amount and the payee of the check or other resource distribution document.

Paper resource distribution documents have limited amount of multi-factor authentication. Thus, a need exists for a device that is capable of generating paper resource distribution documents with strong authentication for prevention of misappropriation.

FIG. 1 illustrates a resource distribution device system environment 200, in accordance with embodiments of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of physical maker coding for resource distribution adjustment and authentication.

As illustrated in FIG. 1, the merchant system 208 is operatively coupled, via a network 201 to the user device 204, financial institution system 207, and to the physical authentication marker device 206. In this way, the merchant system 208 can send information to and receive information from the user device 204, financial institution system 207, and the physical authentication marker device 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that is drafting a resource document or desires to draft a resource document to distribute to a merchant system 208, a financial institution system 207, or another individual to distribute resources from the user 202. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the physical authentication marker device 206, the merchant system 208, and the financial institution system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes and communicate with the physical authentication marker device 206.

As further illustrated in FIG. 1, the financial institution system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 208, the physical authentication marker device 206, and the user device 204. As such, the communication device 246 generally comprises a modem, server, or other device for communicating with other devices on the network 201.

As further illustrated in FIG. 1, the financial institution system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the financial institution system 207 the memory device 250 stores an application 258. Furthermore, the financial institution system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more merchant system 208, financial institution system 207, and/or user device 204.

As illustrated in FIG. 1, the physical authentication marker device 206 is connected to the merchant system 208, user device 204, and financial institution system 207. The physical authentication marker device 206 has the same or similar components as described above with respect to the user device 204 and the financial institution system 207. The physical authentication marker device 206 is described in more detail below with respect to FIG. 2.

As illustrated in FIG. 1, the merchant system 208 is connected to the financial institution system 207, user device 204, and physical authentication marker device 206. In other embodiments, the merchant system 208 may be a third party system separate from the physical authentication marker device 206. The merchant system 208 has the same or similar components as described above with respect to the user device 204 and the physical authentication marker device 206. While only one merchant system 208 is illustrated in FIG. 1, it is understood that multiple merchant system 208 may make up the system environment 200.

In some embodiments, the physical authentication marker device 206 further comprises: linking via a wireless network the physical authentication marker device to internet enabled user devices upon deployment of the physical authentication marker device; associating user resource distribution accounts to the physical authentication marker device and store the accounts in the memory device; requiring an authentication from the user to access the physical authentication marker device, wherein the authentication is performed from one of the user devices and communicated to the physical authentication marker device; allowing user input of information for resource distribution document generation upon authorized authentication; receiving user input of information and confirm request for resource distribution document generation; generating resource distribution document based on input of information, wherein generating the resource distribution document comprises manipulating a printing medium via dimples or embossment of characters associated with the information; and storing an image of the generated resource distribution document for reconciliation.

In some embodiments, the physical authentication marker device 206 further comprises: receiving an indication from a receiving entity that the generated resource distribution document was provided to the receiving entity; confirming authentication of resource distribution document; allowing receiving party to post resource distribution document based on confirmation of authentication; and receiving communication from receiving party of posting of resource distribution document for reconciliation at the physical authentication marker device.

In some embodiments, the physical authentication marker device 206 further comprises encoding the resource distribution document with printed encoding of information from the resource distribution document for a receiving party to decode for confirmation of information on the resource distribution document.

In some embodiments, the authentication from the user to access the physical authentication marker device further comprises authenticating the user into the physical authentication marker device using authentication requirements from one or more applications associated with accessing user resource distribution accounts.

In some embodiments, allowing user input of information for resource distribution document generation upon authorized authentication, further comprises allowing the user to input the information on a mobile device that is linked to the physical authentication marker device via a wireless network, wherein the information comprises an account, a payee, a date, a remittance date, and an amount for resource distribution. In some embodiments, allowing user input of information for resource distribution document generation upon authorized authentication, further comprises allowing the user to input the information directly on the physical authentication marker device via an interface associated with the physical authentication marker device, wherein the information comprises an account, a payee, a date, a remittance date, and an amount for resource distribution.

In some embodiments, user resource distribution accounts comprise one or more accounts across multiple entities that allow for user transfer of resources via paper resource distribution documents to a separate third party.

In some embodiments, dimpling or embossing further comprises dimpling or embossing characters of the resource distribution document including a payee and an amount, wherein the dimpling or embossing occurs to at least a portion of the characters or an outline of the characters such as to identify the characters via a dimpling or embossing pattern and wherein ink is further applied to the dimpling or embossing associated with the information. In some embodiments, the printing medium comprises blank paper or a blank check. In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document.

In some embodiments, the system may encode the amount with dimples or embossing to appear as a random code of numbers, letters, or other characters. In this way, there will be no way of knowing the amount the resource distribution document is made out for without the receiving institution decoding the random code. Furthermore, the pattern of the dimples or embossments will determine the amount. As such, the device may print an actual amount on the resource distribution document in ink, but that amount may be different than the actual amount the resource distribution document is for. In this way, the pattern of the dimples or embossments will determine via the coded pattern, the amount and the payee of the check or other resource distribution document.

It is understood that the servers, systems, and devices described herein illustrate one embodiment of the invention. It is further understood that one or more of the servers, systems, and devices can be combined in other embodiments and still function in the same or similar way as the embodiments described herein. The merchant system 208 may generally include a processing device communicably coupled to devices as a memory device, output devices, input devices, a network interface, a power source, one or more chips, and the like. The merchant system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. Furthermore the system may comprise a disk and input/output. As such there is a potential to add/alter network components, such as bonded/shred/detected networks, and others with the intent to mimic the systems environment.

The memory device may store any of a number of applications or programs which comprise computer-executable instructions/code executed by the processing device to implement the functions of the merchant system 208 described herein.

FIG. 2 illustrates an embodiment of a physical authentication marker device system, in accordance with an embodiment of the present invention. The physical authentication marker device 206 be configured to execute processes and code to print and otherwise distribute resource documents with secure markings or printings associated therewith. The physical authentication marker device 206 may be any mobile communication device with mobile Internet accessing capabilities.

The physical authentication marker device 206 may generally include a processor 110 communicably coupled to such devices as a memory 120, user output devices 136, user input devices 140, a network interface 160, a power source 115, a clock or other timer 150, a camera 170, a positioning system device 175, a resource distribution document source 176, one or more chips 180, and the like.

In some embodiments, the physical authentication marker device 206 and/or the server access one or more databases or datastores (not shown) to search for and/or retrieve information related to printing a physical marker on a resource distribution document. In some embodiments, the physical authentication marker device 206 and/or the server access one or more datastores local to the physical authentication marker device 206 and/or server and in other embodiments, the physical authentication marker device 206 and/or server access datastores remote to the physical authentication marker device 206 and/or server. In some embodiments, the physical authentication marker device 206 and/or server access both a memory and/or a datastore local to the physical authentication marker device 206 and/or server as well as a datastore remote from the physical authentication marker device 206.

The processor 110, and other processors described herein, may generally include circuitry for implementing communication and/or logic functions of the physical authentication marker device 206. For example, the processor 110 may include a digital signal processor device, a microprocessor device, and various analog to digital converters, digital to analog converters, and/or other support circuits. Control and signal processing functions of the mobile device 100 may be allocated between these devices according to their respective capabilities. The processor 110 thus may also include the functionality to receive transmissions, authorize physical printing onto a resource distribution document, and printing dimpled or embossed elements onto a resource distribution document. These elements may include one or more of a payee, payor, account number, amount, date, and the like. The processor 110 may additionally include an internal data modem. Further, the processor 110 may include functionality to operate one or more software programs or applications, which may be stored in the memory 120. For example, the processor 110 may be capable of operating a connectivity program, such as a web browser application 122. The web browser application 122 may then allow the mobile device 100 to transmit and receive web content, such as, for example, location-based content and/or other web page content, according to a Wireless Application Protocol (WAP), Hypertext Transfer Protocol (HTTP), and/or the like.

The processor 110 may also be capable of operating applications, such as a marker application 125 and/or a presentment application 121. The marker application 125 and/or the presentment application 121 may be downloaded from a server and stored in the memory 120 of the physical authentication marker device 206. Alternatively, the marker application 125 and/or the presentment application 121 may be pre-installed and stored in a memory in the chip 180. In such an embodiment, the user may not need to download the marker application 125 and/or the presentment application 121 from a server.

The marker application 125 may be utilized by the physical authentication marker device 206 in order to print, either physically or digitally, terms on a resource distribution document for authentication of the document. In this way, the marker application 125 may receive the information inputted into the physical authentication marker device 206 from one or more user input devices 140 to be put onto the resource distribution document distribution for printing. The marker application 125 confirms the correct information, communicates with the user's account to ensure funds for transferring via the document, and configures the resource distribution document source 176 to print the document according to the inputted and approved data. The resource distribution document source 176 may be a printing device capable of printing on paper a dimpled or embossed effect outlining characters associated with a document.

In this way, the physical authentication marker device 206 imprints, either physically or digitally, a paper resource distribution document for verification and authenticity purposes. In some embodiments, the marker application 125 may receive input from a user via the user input device 140 including an amount for the paper resource distribution document, a date, a payee, remittance data, date to remit, and the like. Once the marker application 125 receives this information, the marker application 125 will trigger a printing the paper resource distribution document or print a portion of the paper resource distribution document with dots or special ink that confirms the paper resource distribution document's authenticity. Furthermore, the marker application 125 may generate an imprint on the paper resource distribution document using user biometrics. As such, the marker application 125 generates a digital or physical imprint on the paper resource distribution document to confirm the generating of the paper resource distribution document was authentic.

In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document.

In some embodiments, the system may encode the amount with dimples or embossing to appear as a random code of numbers, letters, or other characters. In this way, there will be no way of knowing the amount the resource distribution document is made out for without the receiving institution decoding the random code. Furthermore, the pattern of the dimples or embossments will determine the amount. As such, the device may print an actual amount on the resource distribution document in ink, but that amount may be different than the actual amount the resource distribution document is for. In this way, the pattern of the dimples or embossments will determine via the coded pattern, the amount and the payee of the check or other resource distribution document.

The chip 180 may include the necessary circuitry to provide the marker or presentment functionality to the physical authentication marker device 206. Generally, the chip 180 will include data storage 171 which may include data associated with the generation of resource documents. The chip 180 and/or data storage 171 may be an integrated circuit, a microprocessor, a system-on-a-chip, a microcontroller, or the like.

Of note, while FIG. 1 illustrates the Chip 180 as a separate and distinct element within the physical authentication marker device 206, it will be apparent to those skilled in the art that the Chip 180 functionality may be incorporated within other elements in the physical authentication marker device 206. For instance, the functionality of the Chip 180 may be incorporated within the memory 120 and/or processor 110. In a particular embodiment, the functionality of the Chip 180 is incorporated in an element within the physical authentication marker device 206 that provides capabilities to the physical authentication marker device 206. Still further, the Chip 180 functionality may be included in a removable storage device such as an SD card or the like.

The processor 110 may be configured to use the network interface 160 to communicate with one or more other devices on a network. In this regard, the network interface 160 may include an antenna 176 operatively coupled to a transmitter 174 and a receiver 172 (together a "transceiver"). The processor 110 may be configured to provide signals to and receive signals from the transmitter 174 and receiver 172, respectively. The signals may include signaling information in accordance with the air interface standard of the applicable cellular system of the wireless telephone network that may be part of the network. In this regard, the physical authentication marker device 206 may be configured to operate with one or more air interface standards, communication protocols, modulation types, and access types. By way of illustration, the physical authentication marker device 206 may be configured to operate in accordance with any of a number of first, second, third, and/or fourth-generation communication protocols and/or the like. For example, the physical authentication marker device 206 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The physical authentication marker device 206 may also be configured to operate in accordance with non-cellular communication mechanisms, such as via a wireless local area network (WLAN) or other communication/data networks.

The network interface 160 may also include an application interface 173 in order to allow a user to execute some or all of the above-described processes with respect to the marker application 125, presentment application 121, and/or the chip 180. The application interface 173 may have access to the hardware, e.g., the transceiver, and software previously described with respect to the network interface 160. Furthermore, the application interface 173 may have the ability to connect to and communicate with an external data storage on a separate system within the network.

As described above, the physical authentication marker device 206 may have a user interface that includes user output devices 136 and/or user input devices 140. The user output devices 136 may include a display 130 (e.g., a liquid crystal display (LCD) or the like) and a speaker 132 or other audio device, which are operatively coupled to the processor 110. The user input devices 140, which may allow the physical authentication marker device 206 to receive data from a user, may include any of a number of devices allowing the physical authentication marker device 206 to receive data from a user, such as a keypad, keyboard, touch-screen, touchpad, microphone, mouse, joystick, other pointer device, button, soft key, and/or other input device(s).

The physical authentication marker device 206 may further include a power source 115. Generally, the power source 115 is a device that supplies electrical energy to an electrical load. In one embodiment, power source 115 may convert a form of energy such as solar energy, chemical energy, mechanical energy, or the like to electrical energy. Generally, the power source 115 in a physical authentication marker device 206 may be a battery, such as a lithium battery, a nickel-metal hydride battery, or the like, that is used for powering various circuits, e.g., the transceiver circuit, and other devices that are used to operate the physical authentication marker device 206. Alternatively, the power source 115 may be a power adapter that can connect a power supply from a power outlet to the physical authentication marker device 206. In such embodiments, a power adapter may be classified as a power source "in" the physical authentication marker device 206.

The physical authentication marker device 206 may also include a memory 120 operatively coupled to the processor 110. As used herein, memory may include any computer readable medium configured to store data, code, or other information. The memory 120 may include volatile memory, such as volatile Random Access Memory (RAM) including a cache area for the temporary storage of data. The memory 120 may also include non-volatile memory, which can be embedded and/or may be removable. The non-volatile memory may additionally or alternatively include an electrically erasable programmable read-only memory (EEPROM), flash memory or the like.

The memory 120 may store any of a number of applications or programs which comprise computer-executable instructions/code executed by the processor 110 to implement the functions of the physical authentication marker device 206 described herein. For example, the memory 120 may include such applications as a presentment application 121, a web browser application 122, an SMS application, an email application 124, a marker application 125, and the like.

FIG. 3 illustrates generation and activation of the physical authentication marker device 700, in accordance with embodiments of the present invention. As illustrated in block 702, the process 700 is initiated by providing a user with a physical authentication marker device. In this way, the device may be sent to a user for placement of the device within the user's home, office, or the like. Upon deployment of the physical authentication marker device, as illustrated in block 704, the device generates a communicable linkage with user devices within the area. In this way, the device may identify a wireless connection associated with the user's location, such as the user's home wireless network, office network, or the like. Once identified and authorized to the network, the device may identity one or more other user devices on the network. These may be other devices such as mobile phones, computers, internet of things associated devices, or the like. In this way, the device recognizes its location, identifies to other internet capable devices, and links to those devices over the network.

Next, as illustrated in block 706, the process 700 continues by receiving authentication credentials for accessing the functionality of the physical authentication marker device. In some embodiments, the user may provide authentication credentials directly to the device, via a touch pad, biometric scanner, screen, or the like associated with the device. In other embodiments, the user may provide authentication credentials to the physical authentication marker device from a user device or other device on the network that is communicably linked with the physical authentication marker device.

As illustrated in block 708, the process 700 continues by linking user accounts to the physical authentication marker device. In this way, the physical authentication marker device may receive, from the user, one or more user accounts associated with the user. These accounts include one or more funds that a user is able to write a resource distribution document to transfer funds from the account to another individual or third party. Furthermore, in some embodiments, the physical authentication marker device may communicate with the user device and other devices associated with the user and identify the user's accounts. Once the user accounts are identified, the accounts are authorized and linked to the physical authentication marker device to print resource distribution documents from the physical authentication marker device for distribution of funds from the user accounts to a third party.

Next, as illustrated in block 710, the process 700 is completed by allowing the user access of the physical authentication marker device based on an approved authentication credentials received from the user. As such, the user may be authorized into the physical authentication marker device via a user entered password, bio-scan, or the like. Upon recognition of the user at the physical authentication marker device the user may have access to his/her accounts for transferring of funds from the one or more accounts via a resource distribution document. The user may input information for the resource distribution document generation including a payee, date, remittance, account number, date for remittance, and the like. The physical authentication marker device may take the inputted information and print a resource distribution document with dimpled, dotted, or special effect writing.

FIG. 4 illustrates a flowchart of a user of the physical authentication marker device 500, in accordance with embodiments of the present invention. As illustrated in block 502, the process 500 is initiated by receiving authentication from the user for accessing the physical authentication marker device. In this way, the user may provide authentication credentials to the physical authentication marker device for authorization to access the user's accounts. In some embodiments, the user may utilize the physical authentication marker device for accessing an online or mobile banking application associated with the user's accounts. In other embodiments, the user may be authenticated directly into the physical authentication marker device using one or more user input devices on the physical authentication marker device. In other embodiments, the user may be able to authenticate into the physical authentication marker device via a communicable linkage from a device associated with the user that is linked to the physical authentication marker device.

Next, as illustrated in block 504, the process 500 continues after the user has been authenticated into the physical authentication marker device for accessing the user's accounts for generating a resource distribution document by receiving the user selection of the account for resource distribution. As such, the user may be able to access one or more of his/her accounts via authentication. The user may select from the user's accounts a single account to user for resource distribution document generation.

As illustrated in block 506, once the user has selected the account to generate the resource distribution document from the physical authentication marker device, the physical authentication marker device may provide an interface to the user for input the resource distribution information. In this way, the user may input a payee, date, account, amount, remittance information, and the like for completion of the resource distribution document. The user may input this information on an interface associated with the physical authentication marker device. In other embodiments, the user may input this information on a user device or other device associated with the user that is communicably linked to the physical authentication marker device. In some embodiments, the system may identify historic resource distribution documents drafted by the user and predict via learning technologies what the user has historically transacted for using the physical authentication marker device and/or for resource distribution document generation.

Next, as illustrated in block 508, the process 500 continues by populating the information for the resource distribution document provided by the user onto the resource distribution document. In this way, the system confirms the necessary information is received from the user and populates a template for printing the resource distribution document via the physical authentication marker device.

As illustrated in block 510, the process 500 is finalized by using the physical authentication marker device to print the information on a resource distribution document with dimpled or embossed writing. In this way, the user may feed one or more pieces of paper into the physical authentication marker device. The device may take the information inputted by the user and print a resource distribution document on the paper. The resource distribution document may be a check or other document that transfers resources or funds from the user to another individual. Furthermore, the physical authentication marker device may print the information for the resource distribution document on paper with an embossed or dimpled printing to prevent misappropriation of the information on the resource distribution document. In this way, the physical authentication marker device may emboss or dimple the paper as it is printing the resource distribution document by applying localized pressure to the paper to cause an embossed or dimpled effect on the paper while also applying an ink to the paper at the location of the embossed or dimpled area. Furthermore, the embossed or dimpled area may be an impression on the paper that forms an outline of the information provided on that resource distribution document, such as the payee, amount, account number, and the like. In this way, the dimpled or embossed locations form an outline that a receiving institution may be able to clearly identify the numbers or letters being outlined by the dimpled or embossed effect. Furthermore, ink may be applied within the dimpled or embossed area to further form an outline of the numbers and letters on the resource distribution document. In this way, an individual cannot use ink to change the numbers or letters on the resource distribution document without there being a noticeable deviation from the dimpled or embossed areas.

In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document.

In some embodiments, the system may encode the amount with dimples or embossing to appear as a random code of numbers, letters, or other characters. In this way, there will be no way of knowing the amount the resource distribution document is made out for without the receiving institution decoding the random code. Furthermore, the pattern of the dimples or embossments will determine the amount. As such, the device may print an actual amount on the resource distribution document in ink, but that amount may be different than the actual amount the resource distribution document is for. In this way, the pattern of the dimples or embossments will determine via the coded pattern, the amount and the payee of the check or other resource distribution document.

In some embodiments, the physical authentication marker device may generate an imprint on a check or the like using biometrics. In this way, the physical authentication marker device may utilized biometrics of the user or the payee and encode them into the check or resource distribution document. As such, upon utilizing the resource distribution document, the receiving party may review the printed biometrics to confirm the biometrics authorized by the physical authentication marker device is the same as the biometrics of the individual attempting to utilize the resource distribution document. In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document. In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document.

In some embodiments, the system may encode the amount with dimples or embossing to appear as a random code of numbers, letters, or other characters. In this way, there will be no way of knowing the amount the resource distribution document is made out for without the receiving institution decoding the random code. Furthermore, the pattern of the dimples or embossments will determine the amount. As such, the device may print an actual amount on the resource distribution document in ink, but that amount may be different than the actual amount the resource distribution document is for. In this way, the pattern of the dimples or embossments will determine via the coded pattern, the amount and the payee of the check or other resource distribution document.

FIG. 5 illustrates a representation of one embodiment of a resource distribution document 300, in accordance with embodiments of the present invention. The resource distribution document illustrated in FIG. 5 is a check. However, one will appreciate that any financial record, financial document, or the like may be provided as a resource distribution document.

The check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. In some embodiments, all or a portion of all of the check information may be embossed. In some embodiments, all or a portion of all of the check information may be dimpled. In some embodiments, the embossed or dimpled locations may also include ink therein. The physical authentication marker device may collect the check information from the user and apply that information to the check 300 and store the check information in a datastore as metadata. In some embodiments, the pieces of check information may be stored in the datastore individually. In other embodiments, multiple pieces of check information may be stored in the datastore together.

FIG. 6 illustrates a representation of one embodiment of a resource distribution document 400, in accordance with embodiments of the present invention. Again, the resource distribution document illustrated in FIG. 5 is a check. However, one will appreciate that any financial record, financial document, or the like may be provided.

In the illustrated embodiment, the check corresponds to the entire front portion of a check, but it will be understood that the check may also correspond to individual pieces of check information, portions of a check, or the like. The check, in some embodiments, includes the format of certain types of checks associated with a bank, a merchant, an account holder, types of checks, style of checks, check manufacturer, and so forth. By using the check template, the physical authentication marker device can "learn" to map the key attributes of the check for faster and more accurate printing. Furthermore, the physical authentication marker device may map key marker code locations on a physical check, such as to print the check information in the appropriate location.

The check comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like. In some embodiments, all or a portion of all of the check information may be embossed. In some embodiments, all or a portion of all of the check information may be dimpled. In some embodiments, the embossed or dimpled locations may also include ink therein.

FIG. 7 illustrates utilization of the resource distribution document generated from the physical authentication marker device 600, in accordance with embodiments of the present invention. As illustrated on block 602, the process 600 is initiated when a receiving entity receives the resource distribution document. The receiving entity may be a financial institution, device associated with a financial institution, such as an ATM or the like, or another entity capable for receiving and cashing resource distribution documents. The resource distribution document may be dimpled or embossed by the physical authentication marker device.

As illustrated in block 604, the process 600 continues by the receiving entity reviewing the dimpled or embossed resource distribution document. As such, the receiving entity may review the dimpled or embossed locations to ensure that there has been no misappropriation by adding or erasing of ink to change the payee, the amount, or the like associated with the resource distribution document. In this way, the dimples or emboss locations correlate to the resource distribution document information, such to form an outline of the numbers of the amount, the name of the payee, and the like. Furthermore, the physical authentication marker device printed ink within the dotted or embossed regions for further identification of those regions and outline of the resource distribution document information. In some embodiments, the system may dimple or emboss characters in a sequence, such as a sequence of numbers and letters that may be linked to a user account but not be identified by an individual as an account number or the like. In other embodiments, the device may include a directory of payees with unique tokens for each payee that allow the device to print a unique characteristic or symbol on the resource distribution document such that these unique characteristics are dimpled or embossed and can be scanned by the receiving party to identify the payee. As such, a pattern or effect generated by the device dimpling or embossing may identify the payee. In this way, the payee's name may not be located anywhere on the document.

Next, as illustrated in block 606, the process 600 continues by confirming an authentication of the resource distribution document. In some embodiments, the receiving party may identify that the dimples or emboss outlines an amount and payee such that there is no misappropriation of the resource distribution document. In other embodiments, the receiving party may communicate with the system to confirm the payee and amount associated with the resource distribution document.

Finally, as illustrated in block 608, the process 600 is completed by posting the resource distribution document to the payee's account based on authorization. Furthermore, a signal may be transmitted to the physical authentication marker device to notify the physical authentication marker device that the resource distribution document generated has been posted to a payee's account. The physical authentication marker device may notify the user of this posting.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating resource distribution documents, the system comprising a physical authentication marker device comprising:
a memory device with computer-readable program code stored thereon;
a communication device;
a printing device for printing the resource distribution documents;
a processing device operatively coupled to the memory device and the communication device, wherein the processing device is configured to execute the computer-readable program code to:
link via a wireless network the physical authentication marker device to internet enabled user devices upon deployment of the physical authentication marker device;
associate user resource distribution accounts to the physical authentication marker device and store the accounts in the memory device;
require an authentication from the user to access the physical authentication marker device, wherein the authentication is performed from one of the user devices and communicated to the physical authentication marker device;
allow user input of information for resource distribution document generation upon authorized authentication;
receive user input of information and confirm request for resource distribution document generation;
generate and print resource distribution document based on input of information, wherein generating and printing the resource distribution document comprises manipulating a printing medium via dimples or embossment of characters associated with the information on the printing medium for an authenticated formed printed resource distribution document;
generate authenticity of the paper resource distribution document by printing a portion of the paper resource distribution document with dots that confirm the authenticity; and
store an image of the generated paper resource distribution document for reconciliation.

2. The system of claim 1, further comprising:
receiving an indication from a receiving entity that the generated resource distribution document was provided to the receiving entity;
confirming authentication of resource distribution document;
allowing receiving party to post resource distribution document based on confirmation of authentication; and
receiving communication from receiving party of posting of resource distribution document for reconciliation at the physical authentication marker device.

3. The system of claim 1, further comprising encoding the resource distribution document with printed encoding of information from the resource distribution document for a receiving party to decode for confirmation of information on the resource distribution document.

4. The system of claim 1, wherein the authentication from the user to access the physical authentication marker device further comprises authenticating the user into the physical authentication marker device using authentication requirements from one or more applications associated with accessing user resource distribution accounts.

5. The system of claim 1, wherein allowing user input of information for resource distribution document generation upon authorized authentication, further comprises allowing the user to input the information on a mobile device that is linked to the physical authentication marker device via a wireless network, wherein the information comprises an account, a payee, a date, a remittance date, and an amount for resource distribution.

6. The system of claim 1, wherein allowing user input of information for resource distribution document generation upon authorized authentication, further comprises allowing the user to input the information directly on the physical authentication marker device via an interface associated with the physical authentication marker device, wherein the information comprises an account, a payee, a date, a remittance date, and an amount for resource distribution.

7. The system of claim 1, wherein user resource distribution accounts comprise one or more accounts across multiple entities that allow for user transfer of resources via paper resource distribution documents to a separate third party.

8. The system of claim 1, wherein dimpling or embossing further comprises dimpling or embossing characters of the resource distribution document including a payee and an amount, wherein the dimpling or embossing occurs to at least a portion of the characters or an outline of the characters such as to identify the characters via a dimpling or embossing pattern and wherein ink is further applied to the dimpling or embossing associated with the information.

9. The system of claim 1, wherein the printing medium comprises blank paper or a blank check.

10. A computer program product for generating resource distribution documents, the system comprising a physical authentication marker device with at least one non-transitory computer-readable medium having computer-readable program code portions embodied therein, the computer-readable program code portions comprising:
  an executable portion configured for linking via a wireless network the physical authentication marker device to internet enabled user devices upon deployment of the physical authentication marker device;
  an executable portion configured for associating user resource distribution accounts to the physical authentication marker device and store the accounts in the memory device;
  an executable portion configured for requiring an authentication from the user to access the physical authentication marker device, wherein the authentication is performed from one of the user devices and communicated to the physical authentication marker device;
  an executable portion configured for allowing user input of information for resource distribution document generation upon authorized authentication;
  an executable portion configured for receiving user input of information and confirm request for resource distribution document generation;
  an executable portion configured for generating and printing resource distribution document based on input of information, wherein generating and printing the resource distribution document comprises manipulating a printing medium via dimples or embossment of characters associated with the information on the printing medium for an authenticated formed printed resource distribution document;
  an executable portion configured for generating authenticity of the paper resource distribution document by printing a portion of the paper resource distribution document with dots that confirm the authenticity; and
  an executable portion configured for storing an image of the generated paper resource distribution document for reconciliation.

11. The computer program product of claim 10, further comprising:
  an executable portion configured for receiving an indication from a receiving entity that the generated resource distribution document was provided to the receiving entity;
  an executable portion configured for confirming authentication of resource distribution document;
  an executable portion configured for allowing receiving party to post resource distribution document based on confirmation of authentication; and
  an executable portion configured for receiving communication from receiving party of posting of resource distribution document for reconciliation at the physical authentication marker device.

12. The computer program product of claim 10, further comprising an executable portion configured for encoding the resource distribution document with printed encoding of information from the resource distribution document for a receiving party to decode for confirmation of information on the resource distribution document.

13. The computer program product of claim 10, wherein the authentication from the user to access the physical authentication marker device further comprises authenticating the user into the physical authentication marker device using authentication requirements from one or more applications associated with accessing user resource distribution accounts.

14. The computer program product of claim 10, wherein allowing user input of information for resource distribution document generation upon authorized authentication, further comprises allowing the user to input the information on a mobile device that is linked to the physical authentication marker device via a wireless network, wherein the information comprises an account, a payee, a date, a remittance date, and an amount for resource distribution.

15. The computer program product of claim 10, wherein allowing user input of information for resource distribution document generation upon authorized authentication, further comprises allowing the user to input the information directly on the physical authentication marker device via an interface associated with the physical authentication marker device, wherein the information comprises an account, a payee, a date, a remittance date, and an amount for resource distribution.

16. The computer program product of claim 10, wherein user resource distribution accounts comprise one or more accounts across multiple entities that allow for user transfer of resources via paper resource distribution documents to a separate third party.

17. The computer program product of claim 10, wherein dimpling or embossing further comprises dimpling or embossing characters of the resource distribution document including a payee and an amount, wherein the dimpling or embossing occurs to at least a portion of the characters or an outline of the characters such as to identify the characters via a dimpling or embossing pattern and wherein ink is further applied to the dimpling or embossing associated with the information.

18. A computer-implemented method for generating resource distribution documents including a physical authentication marker device, the method comprising:
  providing a computing system comprising a computer processing device and a non-transitory computer readable medium, where the computer readable medium comprises configured computer program instruction code, such that when said instruction code is operated by said computer processing device, said computer processing device performs the following operations:
    linking via a wireless network the physical authentication marker device to internet enabled user devices upon deployment of the physical authentication marker device;

associating user resource distribution accounts to the physical authentication marker device and store the accounts in the memory device;

requiring an authentication from the user to access the physical authentication marker device, wherein the authentication is performed from one of the user devices and communicated to the physical authentication marker device;

allowing user input of information for resource distribution document generation upon authorized authentication;

receiving user input of information and confirm request for resource distribution document generation;

generating and printing resource distribution document based on input of information, wherein generating and printing the resource distribution document comprises manipulating a printing medium via dimples or embossment of characters associated with the information on the printing medium for an authenticated formed printed resource distribution document;

generating authenticity of the paper resource distribution document by printing a portion of the paper resource distribution document with dots that confirm the authenticity; and storing an image of the generated paper resource distribution document for reconciliation.

19. The computer-implemented method of claim 18, further comprising:

receiving an indication from a receiving entity that the generated resource distribution document was provided to the receiving entity;

confirming authentication of resource distribution document;

allowing receiving party to post resource distribution document based on confirmation of authentication; and receiving communication from receiving party of posting of resource distribution document for reconciliation at the physical authentication marker device.

20. The computer-implemented method of claim 18, further comprising encoding the resource distribution document with printed encoding of information from the resource distribution document for a receiving party to decode for confirmation of information on the resource distribution document.

* * * * *